United States Patent
Yoshima et al.

(10) Patent No.: US 11,128,385 B2
(45) Date of Patent: Sep. 21, 2021

(54) SIGNAL DETECTION CIRCUIT, OPTICAL RECEIVER, MASTER STATION DEVICE, AND SIGNAL DETECTION METHOD

(71) Applicant: Mitsubishi Electric Corporation, Tokyo (JP)

(72) Inventors: Satoshi Yoshima, Tokyo (JP); Takanori Kawanaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/909,545

(22) Filed: Jun. 23, 2020

(65) Prior Publication Data

US 2020/0322063 A1    Oct. 8, 2020

Related U.S. Application Data

(63) Continuation of application No. PCT/JP2018/007017, filed on Feb. 26, 2018.

(51) Int. Cl.
*H04B 10/69* (2013.01)
(52) U.S. Cl.
CPC .................. *H04B 10/69* (2013.01)
(58) Field of Classification Search
CPC ....................................................... H04B 10/69
See application file for complete search history.

(56) References Cited

U.S. PATENT DOCUMENTS

| | | | | |
|---|---|---|---|---|
| 5,179,577 A | * | 1/1993 | Ilyadis | H04L 25/06 327/72 |
| 5,414,708 A | * | 5/1995 | Webber | H04L 12/44 370/445 |
| 10,866,672 B2 | * | 12/2020 | Seo | G06F 3/04166 |
| 2005/0271168 A1 | * | 12/2005 | Tsai | H04L 7/0331 375/344 |
| 2006/0251428 A1 | * | 11/2006 | Gieseler | H03F 3/45183 398/189 |
| 2010/0313059 A1 | * | 12/2010 | Wang | H04L 7/046 713/502 |

(Continued)

FOREIGN PATENT DOCUMENTS

| | | |
|---|---|---|
| JP | 2009-44228 A | 2/2009 |
| JP | 4856771 B2 | 1/2012 |
| JP | 2015-88850 A | 5/2015 |

*Primary Examiner* — Tanya T Motsinger
(74) *Attorney, Agent, or Firm* — Birch, Stewart, Kolasch & Birch, LLP

(57) ABSTRACT

A signal detection circuit includes: a first DC voltage remover that removes a DC voltage from an input differential signal; a limiting amplifier that adjusts an amplitude of the input differential signal; a reset signal generator that generates an internal reset signal on the basis of the input differential signal obtained after the amplitude is adjusted; a first bias voltage applying unit that generates a differential signal for detection by applying a bias voltage to the signal from which the DC voltage is removed; and a flip-flop circuit that generates a packet detection signal by holding a state indicating input of a packet signal on the basis of the differential signal for detection and releasing the holding on the basis of the internal reset signal. The reset signal generator includes: a differential single-phase conversion circuit; a voltage holding circuit; and a voltage comparison circuit.

11 Claims, 8 Drawing Sheets

(56) References Cited

U.S. PATENT DOCUMENTS

| | | | | |
|---|---|---|---|---|
| 2011/0129233 A1* | 6/2011 | Kim | .................... | H04B 10/6933 |
| | | | | 398/202 |
| 2012/0051479 A1* | 3/2012 | Liu | ........................... | G06F 1/12 |
| | | | | 375/371 |
| 2012/0254600 A1* | 10/2012 | Fujimoto | ................ | G06F 13/00 |
| | | | | 713/1 |
| 2013/0039649 A1* | 2/2013 | Koizumi | .............. | H04B 10/697 |
| | | | | 398/25 |
| 2020/0322063 A1* | 10/2020 | Yoshima | ............. | H04L 25/0296 |

* cited by examiner

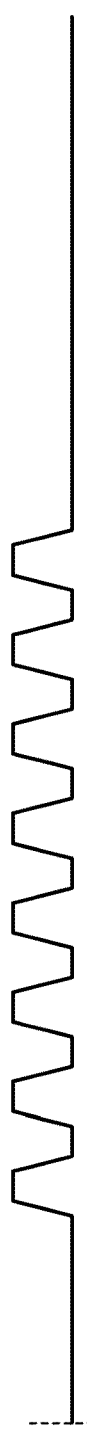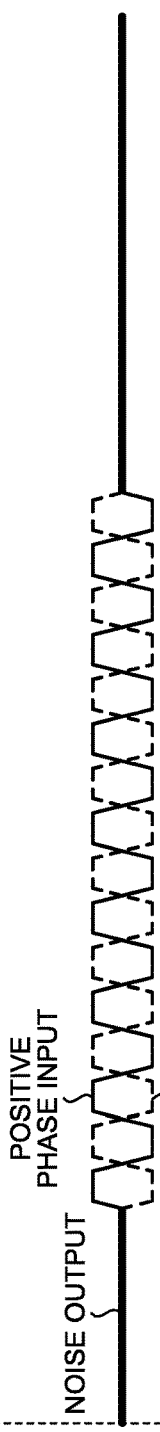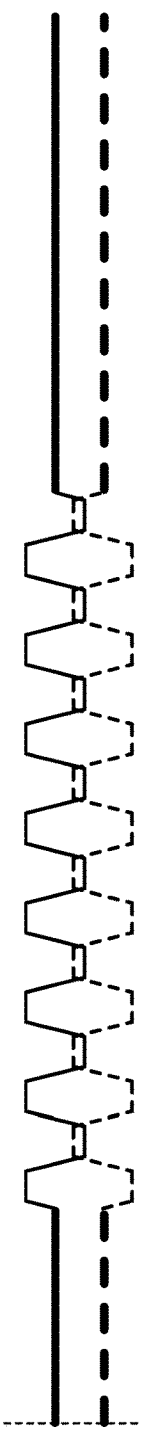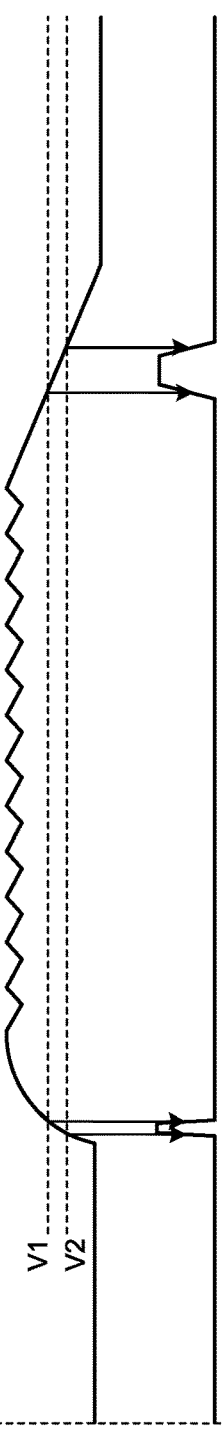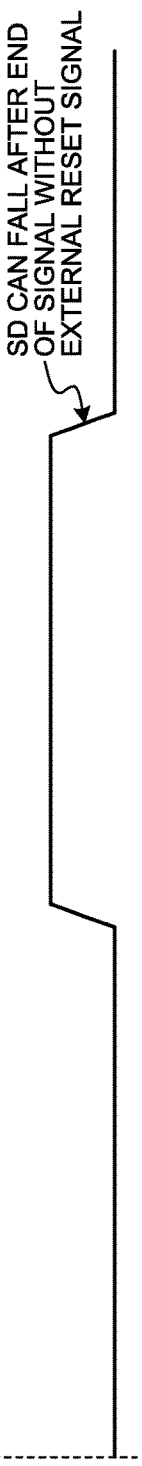
FIG.4A OPTICAL INPUT SIGNAL
FIG.4B PREAMPLIFIER OUTPUT SIGNAL
FIG.4C INPUT SIGNAL TO RESET SIGNAL GENERATION UNIT
FIG.4D OUTPUT SIGNAL OF EMITTER FOLLOWER [Vout]
FIG.4E OUTPUT SIGNAL OF RESET SIGNAL GENERATION UNIT
FIG.4F EXTERNAL RESET SIGNAL
FIG.4G SD OUTPUT SIGNAL

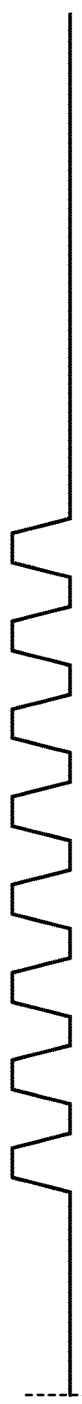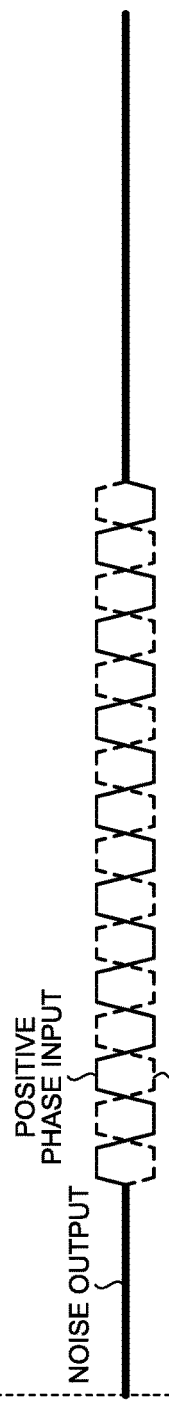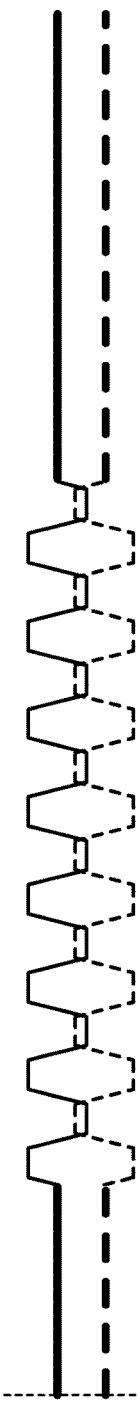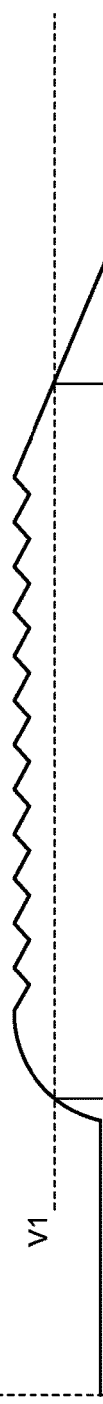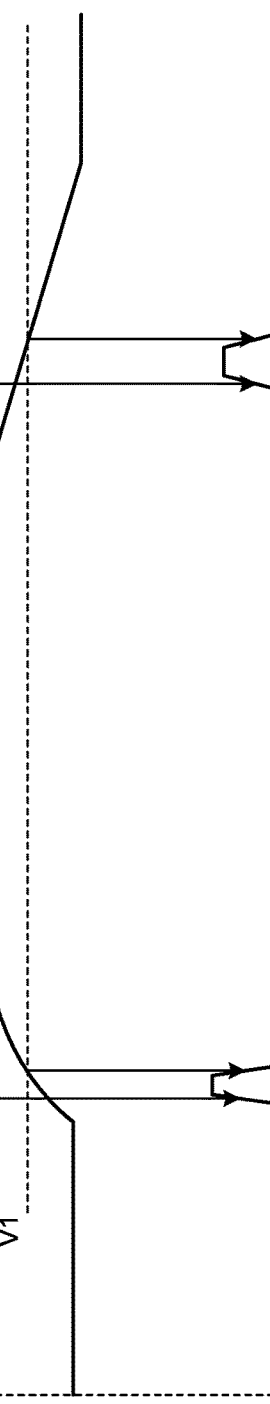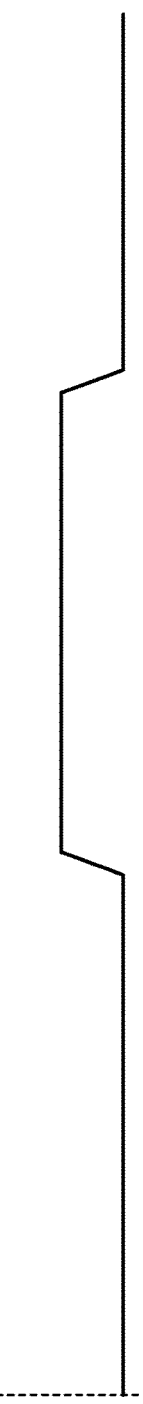
FIG.7A OPTICAL INPUT SIGNAL
FIG.7B PREAMPLIFIER OUTPUT SIGNAL
FIG.7C INPUT SIGNAL TO RESET SIGNAL GENERATION UNIT
FIG.7D OUTPUT SIGNAL OF EMITTER FOLLOWER (1) [Vout1]
FIG.7E OUTPUT SIGNAL OF EMITTER FOLLOWER (2) [Vout2]
FIG.7F OUTPUT SIGNAL OF RESET SIGNAL GENERATION UNIT
FIG.7G SD OUTPUT SIGNAL

SIGNAL DETECTION CIRCUIT, OPTICAL RECEIVER, MASTER STATION DEVICE, AND SIGNAL DETECTION METHOD

CROSS-REFERENCE TO RELATED APPLICATION

This application is a continuation application of International Application PCT/JP2018/007017, filed on Feb. 26, 2018, and designating the U.S., the entire contents of which are incorporated herein by reference.

BACKGROUND OF THE INVENTION

1. Field of the Invention

The present disclosure relates to a signal detection circuit that detects the head and tail end of an optical signal transmitted in burst mode, an optical receiver, a master station device, and a signal detection method.

2. Description of the Related Art

Japanese Patent Application Laid-open No. 2015-88850 describes an example of a conventional circuit that detects an optical signal transmitted in burst mode. At an optical line terminal (OLT) that is a master station device in a one-to-many optical communication system called a passive optical network (PON), a signal detection circuit described in Japanese Patent Application Laid-open No. 2015-88850 detects an optical signal transmitted in burst mode from an optical network unit (ONU) that is a slave station device.

The signal detection circuit described in Japanese Patent Application Laid-open No. 2015-88850 includes a flip-flop circuit that latches a state of an output signal when receiving a signal having a waveform that indicates a start portion of an optical packet signal in burst mode which is the optical signal transmitted in burst mode from the slave station device. The signal detection circuit described in Japanese Patent Application Laid-open No. 2015-88850 detects the start of input of the optical packet signal by the flip-flop circuit and, when the optical packet signal is no longer input, resets the flip-flop circuit to wait for input of a next optical packet signal.

In the signal detection circuit described in Japanese Patent Application Laid-open No. 2015-88850, a reset signal generation unit that generates a reset signal of the flip-flop circuit integrates the amplitude of the input signal with respect to the time axis and performs a threshold determination on the value obtained by the integration processing to generate the reset signal. Therefore, in the signal detection circuit described in Japanese Patent Application Laid-open No. 2015-88850, there is a trade-off relationship between high-speed response characteristics and characteristics of the possibility of a malfunction due to degradation of a signal-to-noise ratio (SNR), so that the frequency of occurrence of malfunctions increases when the high-speed response characteristics are to be improved.

The present disclosure has been made in view of the above, and an object of the present disclosure is to provide a signal detection circuit that can improve high-speed response characteristics while preventing or reducing an increase in the frequency of occurrence of malfunctions.

SUMMARY OF THE INVENTION

To solve the above problems and achieve the object a signal detection circuit according to the present disclosure includes: a first DC voltage remover to remove a DC voltage from an input differential signal including a packet signal in burst mode; an amplitude adjuster to adjust an amplitude of the input differential signal; a reset signal generator to generate an internal reset signal at a head and after an end of the packet signal on the basis of the input differential signal obtained after the amplitude is adjusted by the amplitude adjuster; a first bias voltage applying circuitry to generate a differential signal for detection by applying a bias voltage of a predetermined value to the signal from which the DC voltage is removed by the first DC voltage remover; and a packet detection signal generator to generate a packet detection signal that indicates signal input and signal disconnection of the packet signal by holding a state indicating input of the packet signal on the basis of the differential signal for detection and releasing the holding on the basis of the internal reset signal. The reset signal generator includes: a differential single-phase conversion circuit to convert a differential signal into a single-phase signal, the differential signal being based on the input differential signal obtained after the amplitude is adjusted; a voltage holding circuit to hold a voltage of the single-phase signal; and a voltage comparison circuit to generate the internal reset signal on the basis of a result of comparison between the voltage held by the voltage holding circuit and a predetermined threshold voltage.

BRIEF DESCRIPTION OF THE DRAWINGS

FIGS. 4A to 4G are diagrams illustrating a timing chart of a signal detection operation by the optical receiver according to the first embodiment;

FIGS. 7A to 7G are diagrams illustrating a timing chart of a signal detection operation by an optical receiver according to the second embodiment.

DETAILED DESCRIPTION OF THE PREFERRED EMBODIMENTS

A signal detection circuit, an optical receiver, a master station device, and a signal detection method according to embodiments of the present disclosure will now be described in detail with reference to the drawings. Note that the present disclosure is not limited to the embodiments.

First Embodiment

Figure 1:
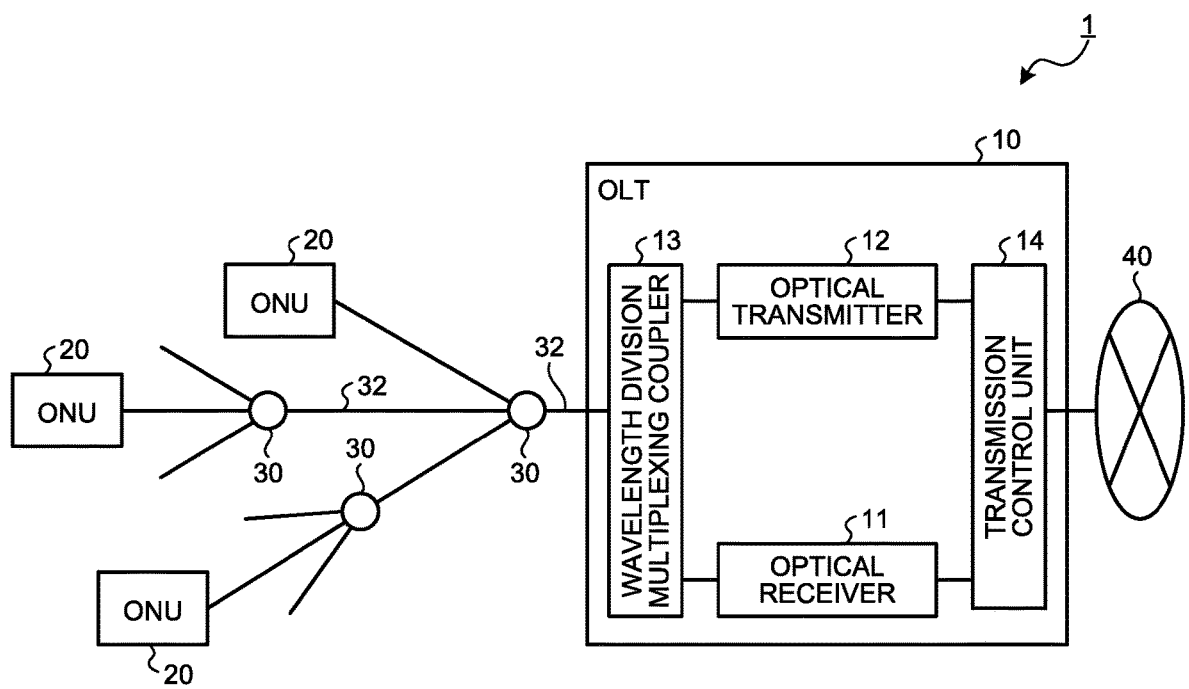
FIG. 1 is a diagram illustrating an example of the configuration of an optical communication system according to a first embodiment.

FIG. 1 is a diagram illustrating an example of the configuration of an optical communication system including an optical receiver according to a first embodiment of the present disclosure.

An optical communication system 1 according to the first embodiment is a PON system adopting the form of one-to-many optical communication. As illustrated in FIG. 1, the optical communication system 1 includes one OLT 10 as a master station device, ONUs 20 as a plurality of slave station devices, and optical star couplers 30 that passively split and join an optical signal. All the ONUs 20 are connected to the OLT 10 via one or more of the optical star couplers 30 and an optical fiber 32.

The OLT 10 includes an optical receiver 11, an optical transmitter 12, a wavelength division multiplexing coupler 13, and a transmission controller 14. The wavelength division multiplexing coupler 13 outputs a downstream signal and an upstream signal, having different optical wavelengths, in different directions from each other. Specifically, the wavelength division multiplexing coupler 13 outputs an optical signal output from the ONU 20 and transmitted through the optical fiber 32 to the side of the optical receiver 11, and outputs an optical signal output from the optical transmitter 12 and transmitted through the optical fiber 32 to the side of the optical fiber 32 to which the ONU 20 is connected.

The transmission controller 14 generates a modulation signal on the basis of a baseband signal input from an external network 40 such as the Internet, and inputs the modulation signal to the optical transmitter 12. The optical transmitter 12 modulates light emitted by a light emitting element such as a semiconductor laser with the modulation signal input from the transmission controller 14. The modulated optical signal is: output as a downstream signal via the wavelength division multiplexing coupler 13; transmitted through the optical fiber 32; and received by each of the ONU 20.

An upstream optical signal transmitted from the ONU 20 through the optical fiber 32 is input to the optical receiver 11 via the wavelength division multiplexing coupler 13. The optical receiver 11 performs photoelectric conversion on the input optical signal to demodulate it into a received signal of a voltage signal, and outputs the received signal to the transmission controller 14. In addition to the received signal, the optical receiver 11 outputs, to the transmission controller 14, a detection signal indicating a result of detecting signal input or signal disconnection of a packet signal.

The transmission controller 14 converts the received signal into a baseband signal and outputs the baseband signal to the external network 40. The transmission controller 14: detects a code indicating an end of the packet from the received signal; generates an external reset signal on the basis of the detected code; and outputs the external reset signal to the optical receiver 11.

Here, the optical signal transmitted from each of the ONUs 20 is a packet signal transmitted in burst mode, where a plurality of the packet signals transmitted from the ONUs 20 is subjected to time division multiplexing so that a serial of intermittent optical signals are input to the OLT 10. Hereinafter, the optical signal transmitted in burst mode from each of the ONUs 20 is referred to as an optical packet signal.

Figure 2:
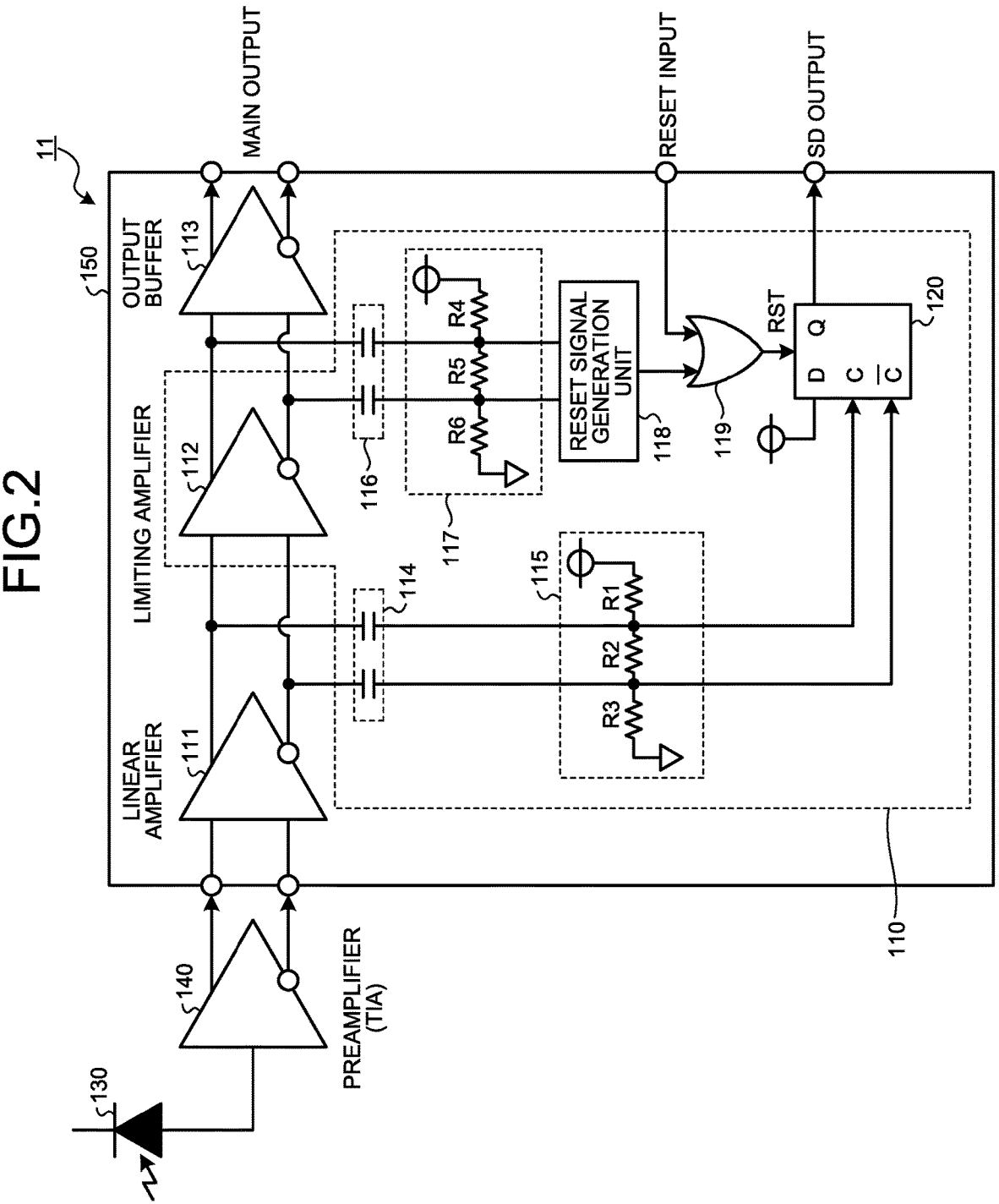
FIG. 2 is a diagram illustrating an example of the configuration of an optical receiver according to the first embodiment.

FIG. 2 is a diagram illustrating an example of the configuration of the optical receiver 11 according to the first embodiment. The optical receiver 11 includes: a light receiving element 130 that outputs a current signal corresponding to an optical signal received; a preamplifier (trans-impedance amplifier (TIA)) 140 that converts the current signal output from the light receiving element 130 into a voltage signal; and a main amplifier circuit 150 that amplifies the voltage signal output by the preamplifier 140 and outputs the amplified voltage signal to the transmission controller 14. The preamplifier 140 corresponds to a preamplifier circuit.

The main amplifier circuit 150 includes: a linear amplifier 111 that differentially amplifies the voltage signal input from the preamplifier 140; a limiting amplifier 112 that adjusts the output of the linear amplifier 111 to a differential signal having a constant amplitude; and an output buffer 113 that outputs the signal output from the limiting amplifier 112 as a received signal.

The main amplifier circuit 150 further includes: a first direct current (DC) voltage remover 114 that removes a DC voltage from a signal obtained by splitting a portion of the output of the linear amplifier 111; and a first bias voltage applying unit 115 that generates a differential signal for detection by applying a bias voltage of a predetermined value to the differential signal from which the DC voltage is removed by the first DC voltage remover 114. The main amplifier circuit 150 further includes: a second DC voltage remover 116 that removes a DC voltage from a signal obtained by splitting a portion of the output of the limiting amplifier 112; a second bias voltage applying circuitry 117 that generates a differential signal for reset by applying a bias voltage of a predetermined value to the differential signal from which the DC voltage is removed by the second DC voltage remover 116; and a reset signal generator 118 that outputs an internal reset signal at the head and tail end of the optical packet signal on the basis of the differential signal for reset input from the second bias voltage applying circuitry 117.

The main amplifier circuit 150 further includes: a logical OR circuit 119 that outputs, as a reset signal, a logical OR of the internal reset signal output from the reset signal generator 118 and an external reset signal input from the outside via a reset input terminal; and a flip-flop circuit 120 that outputs a packet detection signal (signal detect (SD)) indicating the presence or absence of the optical packet signal on the basis of the differential signal for detection output from the first bias voltage applying circuitry 115 and the reset signal output from the logical OR circuit 119. The external reset signal input from the outside via the reset input terminal is generated by the transmission controller 14 as described above.

Among the components of the main amplifier circuit 150, the limiting amplifier 112, the first DC voltage remover 114, the first bias voltage applying circuitry 115, the second DC voltage remover 116, the second bias voltage applying circuitry 117, the reset signal generator 118, the logical OR circuit 119, and the flip-flop circuit 120 are included in a signal detection circuit 110.

The linear amplifier 111 is a low-noise high-frequency differential amplifier. The first DC voltage remover 114 and the second DC voltage remover 116 each includes a capacitor that allows only a high frequency component to pass. The first bias voltage applying unit 115 and the second bias voltage applying unit 117 each includes a power supply and a plurality of resistors. The first bias voltage applying unit 115 divides a power supply voltage by a voltage divider including resistors R1, R2, and R3, thereby applying the predetermined bias voltage to the signal from which the DC component is removed by the first DC voltage remover 114. The second bias voltage applying unit 117 divides a power supply voltage by a voltage divider including resistors R4, R5, and R6, thereby applying the predetermined bias voltage to the signal from which the DC component is removed by the second DC voltage remover 116.

The flip-flop circuit 120 is a flip-flop circuit of an arbitrary reset input type and includes, for example, a D flip-flop circuit or an SR flip-flop circuit. The example of configuration illustrated in FIG. 2 illustrates a case where the flip-flop circuit 120 is a D flip-flop circuit. The differential signal for detection output from the first bias voltage applying unit 115 is input to differential clock terminals (C and C bar), and the reset signal output from the logical OR circuit 119 is input to a reset terminal (RST). The flip-flop circuit 120 holds a state indicating signal input at the time of the rise of the differential signal for detection and releases the hold at the time of the input of the reset signal, thereby outputting the packet detection signal indicating whether or not the optical packet signal is detected. The flip-flop circuit 120 is a packet detection signal generator that generates the packet detection signal.

Figure 3:
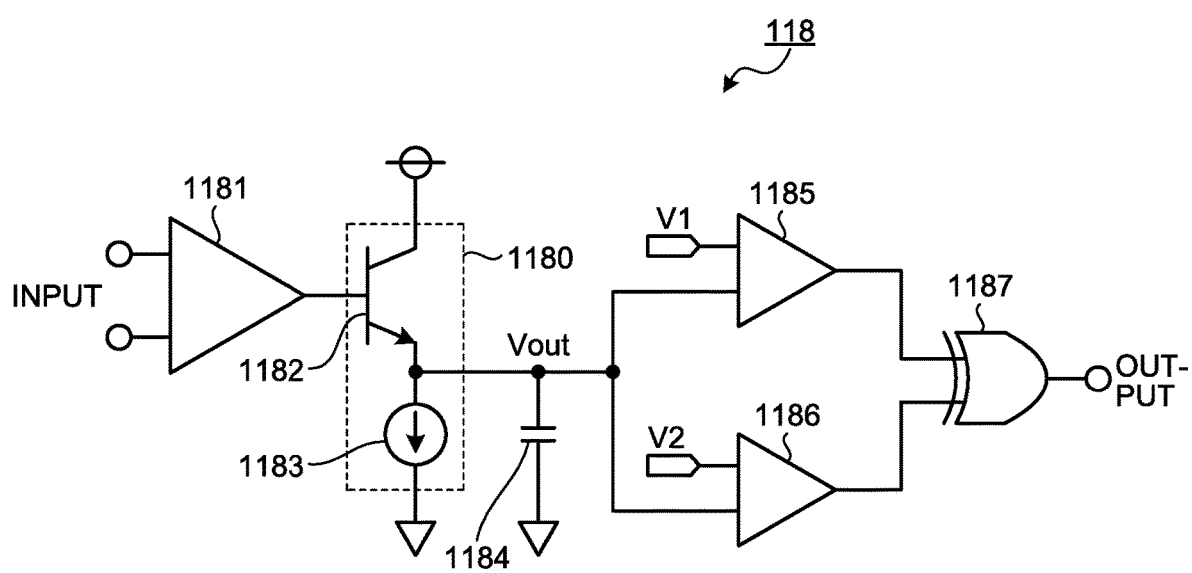
FIG. 3 is a diagram illustrating an example of the configuration of a reset signal generator included in a signal detection circuit according to the first embodiment.

FIG. 3 is a diagram illustrating an example of the configuration of the reset signal generator 118 included in the signal detection circuit 110 according to the first embodiment.

As illustrated in FIG. 3, the reset signal generator 118 includes: a differential single-phase conversion buffer 1181 that converts the differential signal for reset output from the second bias voltage applying unit 117 into a single-phase signal; a transistor 1182 and a current source 1183 for an emitter follower circuit 1180; a capacitor 1184 that holds an output voltage of the emitter follower circuit 1180; comparators 1185 and 1186 that use different threshold voltages (V1 and V2) to compare the threshold voltages with the output voltage of the emitter follower circuit 1180; and an exclusive OR circuit 1187 that performs an exclusive OR operation on the outputs of the comparators 1185 and 1186. Note that the differential single-phase conversion buffer 1181 corresponds to a differential single-phase conversion circuit, the emitter follower circuit 1180 corresponds to a voltage holding circuit, and the exclusive OR circuit 1187 corresponds to a voltage comparison circuit.

An operation related to signal detection of the optical receiver 11 configured as described above will be described with reference to timing charts of FIGS. 4A to 4G. FIGS. 4A to 4G are diagrams illustrating the timing chart of a signal detection operation by the optical receiver 11 according to the first embodiment. FIGS. 4A to 4G illustrate a response of each signal when an optical signal including an optical packet signal in burst mode as illustrated in FIG. 4A is input to the light receiving element 130.

FIG. 4A illustrates an optical packet signal of alternating "1"s and "0"s. Such an optical packet signal is subjected to photoelectric conversion by the light receiving element 130, and the photocurrent output from the light receiving element 130 is subjected to current-voltage conversion by the preamplifier 140.

As illustrated in FIG. 4B, a signal output from the preamplifier 140 and input to the main amplifier circuit 150 is a signal containing output noise of the preamplifier 140 in a no-signal section before the optical packet signal transmitted from the ONU 20 starts to be input. The output noise of the preamplifier 140 is noise generated inside the preamplifier 140. Moreover, in a signal input section in which the optical packet signal transmitted from the ONU 20 is input, a differential signal including a positive phase input and a negative phase input based on the pattern of the input optical packet signal is input to the main amplifier circuit 150.

In the main amplifier circuit 150, the input differential signal is differentially amplified by the linear amplifier 111. The signal amplified by the linear amplifier 111 is input to the limiting amplifier 112 and at the same time split as the differential signal for detection to be input to the first DC voltage remover 114. The capacitor of the first DC voltage remover 114 removes the DC voltage component of the differential signal for detection, the first bias voltage applying unit 115 applies the bias voltage of a predetermined value to the differential signal for detection, and the flip-flop circuit 120 receives the differential signal for detection. The circuit that generates the differential signal for detection input to the flip-flop circuit 120, that is, the first DC voltage remover 114 and the first bias voltage applying unit 115, is similar to a circuit that generates a differential signal for detection in the signal detection circuit described in Japanese Patent Application Laid-open No. 2015-88850 described above. A capacitance value of the capacitor included in the first DC voltage remover 114 and a resistance value of the resistor included in the first bias voltage applying unit 115 are set so as to generate the differential signal for detection that is not affected by the noise generated in the preamplifier 140. Moreover, the capacitance value of the capacitor included in the first DC voltage remover 114 and the resistance value of the resistor included in the first bias voltage applying unit 115 are set such that a voltage range of the input signal of the flip-flop circuit 120 corresponds to a voltage range in which each subsequent circuit can operate, and has a certain interval of voltage or smaller in order for the signal to be identified as the differential signal when the optical packet signal is received.

The limiting amplifier 112 adjusts the amplitude by amplifying or limiting the differential signal input from the linear amplifier 111, and generates a differential signal having a predetermined amplitude. That is, the limiting amplifier 112 performs amplification processing when the amplitude of the differential signal input from the linear amplifier 111 is smaller than a predetermined value, or limits the amplitude by limiting processing when the amplitude of the differential signal input from the linear amplifier 111 is larger than a predetermined value. The limiting amplifier 112 is an amplitude adjuster that adjusts the amplitude of an input differential signal which is the differential signal input from the linear amplifier 111. The signal whose amplitude has been adjusted by the limiting amplifier 112 is input to the output buffer 113 and at the same time split as the differential signal for reset to be input to the second DC voltage remover 116. The capacitor of the second DC voltage remover 116 removes the DC voltage component of the differential signal for reset, the second bias voltage applying unit 117 applies the bias voltage of a predetermined value to the differential signal for reset, and the reset signal generator 118 receives the differential signal for reset.

Here, as illustrated in FIG. 4C, an input signal to the reset signal generator 118 needs to have an input signal-to-noise ratio (SNR) higher than or equal to a predetermined value in order to avoid a malfunction due to noise generated in the preamplifier 140. That is, a capacitance value of the capacitor included in the second DC voltage remover 116 and a resistance value of the resistor included in the second bias voltage applying unit 117 are set so as to generate the differential signal for reset that reduces the influence of the noise generated in the preamplifier 140 and has the SNR higher than or equal to the predetermined value.

The differential signal for reset input to the reset signal generator 118 is converted into a single-phase signal by the differential single-phase conversion buffer 1181 at the input stage. After that, the electric charge is accumulated in the capacitor 1184 by the emitter follower circuit 1180 (the transistor 1182 and the current source 1183) while a signal of "1" is input, and the electric charge accumulated in the capacitor 1184 is discharged by the current source 1183 while a signal of "0" is input. Here, while the signal of "1"

is input, the emitter current of the transistor 1182 in the emitter follower circuit 1180 increases as compared to that while the signal of "0" is input so that, as illustrated in FIG. 4D, an output voltage Vout of the emitter follower circuit 1180 increases rapidly at the start of reception of the packet signal. On the other hand, while the signal of "0" is input, the output voltage Vout decreases linearly with time at the rate of I/C based on a current value I of the current source 1183 of the emitter follower circuit 1180 and capacitance C of the capacitor 1184.

An exclusive OR of a result of comparison between the output voltage Vout of the emitter follower circuit 1180 and the threshold voltage V1 by the comparator 1185 and a result of comparison between the output voltage Vout of the emitter follower circuit 1180 and the threshold voltage V2 by the comparator 1186 is output from the exclusive OR circuit 1187. Here, the threshold voltages are set such that V2<V1, the threshold voltage V2 is higher than the noise level of the emitter follower circuit 1180, and the threshold voltage V1 is lower than the lowest value of the output signal of the emitter follower circuit 1180 when the packet signal is input. The reset signal generator 118 thus outputs an internal reset signal that is at high level when V2≤Vout≤V1 and is at low level otherwise, as illustrated in FIG. 4E. That is, as illustrated in FIG. 4E, the internal reset signal is at high level when the input of the optical packet signal is started and when the input is completed.

The internal reset signal has the duration longer than or equal to the length of a consecutive identical digit (CID) signal such that a reset signal is not output by mistake even when the CID signal having a length of about 72 bits or the like is input. That is, the duration of the internal reset signal in one high level period is set to be longer than or equal to the length of the CID signal. For example, the duration of the internal reset signal in one high level period is set to about 5 ns to 30 ns. The current value of the emitter follower circuit 1180, the capacitance of the capacitor 1184, the threshold voltage V1, and the threshold voltage V2 are determined such that the signal has the above described duration.

Moreover, an external reset signal as illustrated in FIG. 4F is input to the signal detection circuit 110. The logical OR circuit 119 of the signal detection circuit 110 outputs a reset signal that is a logical OR of the internal reset signal output by the reset signal generator 118 and the external reset signal input from the outside.

The differential signal for detection is input to the differential clock terminal of the flip-flop circuit 120. When a preamble signal (for example, a signal of alternating "1"s and "0"s) of a next packet signal is input to the differential clock terminal after the reset signal is input to the reset terminal, the flip-flop circuit 120 holds or latches data input connected to a constant voltage source and outputs high. Also, when the reset signal is input to the reset terminal (transition from low to high), the flip-flop circuit 120 releases hold of the voltage value of the data input being held and switches the output to low. As a result, the flip-flop circuit 120 outputs a packet detection signal (SD output signal in FIG. 4G) that is high near the head of the optical packet signal and low near the tail end of the optical packet signal. Therefore, a high-speed response can be made at both the head and tail end of the input of the optical packet signal.

Here, the logical OR circuit 119 outputs the logical OR of the internal reset signal and the external reset signal so that, even when the internal reset signal is not generated due to a short guard time between packets, the reset signal is input from the outside near the head of the packet during the guard time. Moreover, even when the internal reset signal has a reset width in which the flip-flop circuit 120 does not operate, the reset signal based on the external reset signal is input to the flip-flop circuit 120. Thus, when signal disconnection is detected on the basis of the external reset signal, the current value of the emitter follower circuit 1180, the capacitance value of the capacitor, and the threshold voltages V1 and V2 may be determined such that the internal reset signal is generated after an appropriate time from the end of the packet. As a result, the flip-flop circuit 120 can reliably output the packet detection signal indicating signal disconnection after the end of the packet, and can also reliably output a packet detection signal indicating signal input of a next packet.

Figure 5:
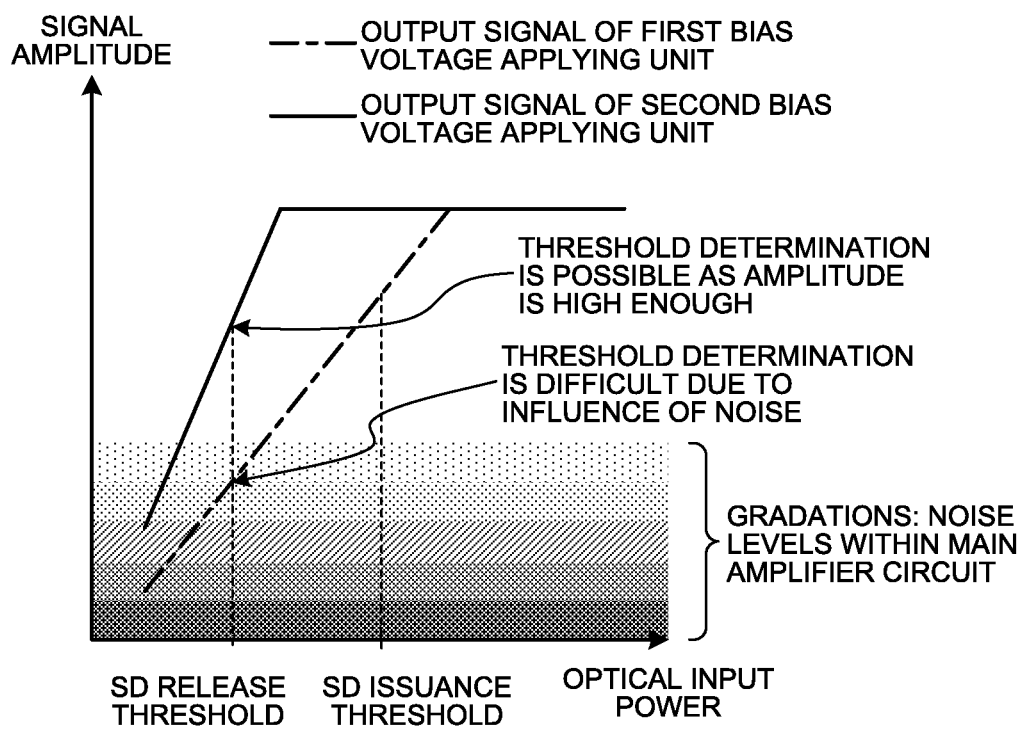
FIG. 5 is a diagram for explaining an operation of the reset signal generator of the signal detection circuit according to the first embodiment.

Moreover, the reset signal generator 118 generates the internal reset signal using the differential signal whose amplitude has been adjusted by the limiting amplifier 112, thereby being able to prevent or reduce a malfunction due to the influence of noise as compared with a case where the internal reset signal is generated using the differential signal before being amplified by the limiting amplifier 112. FIG. 5 is a diagram for explaining the operation of the reset signal generator 118 of the signal detection circuit 110 according to the first embodiment. In FIG. 5, a dashed line indicates the output signal of the first bias voltage applying unit 115, and a solid line indicates the output signal of the second bias voltage applying unit 117. In FIG. 5, a horizontal axis represents the optical input power to the optical receiver 11, and a vertical axis represents the amplitude of the output signal of the first bias voltage applying unit 115 and the amplitude of the output signal of the second bias voltage applying unit 117. Also, an SD release threshold is a threshold used by the reset signal generator 118 to generate the internal reset signal.

As described above, the first bias voltage applying circuitry 115 applies the bias voltage to the signal before being amplified by the limiting amplifier 112, whereas the second bias voltage applying unit 117 applies the bias voltage to the signal after being amplified by the limiting amplifier 112. Thus, as illustrated in FIG. 5, when the optical input power to the optical receiver 11 is the same, the amplitude of the output signal of the second bias voltage applying unit 117 is larger than the amplitude of the output signal of the first bias voltage applying unit 115. Accordingly, when the reset signal generator 118 generates the internal reset signal by detecting the input of the optical packet signal on the basis of the output signal of the second bias voltage applying unit 117, the influence of noise is less than when the internal reset signal is generated by detecting the input of the optical packet signal on the basis of the output signal of the first bias voltage applying unit 115, whereby the frequency of occurrence of false detection can be reduced. Although FIG. 5 illustrates the example when the optical receiver 11 starts receiving the optical packet signal, the similar applies to a case where the optical receiver ends the reception of the optical packet signal. When the reset signal generator 118 generates the internal reset signal by detecting the end of reception of the optical packet signal as well, the frequency of occurrence of false detection can be better reduced by detecting the end of the input of the optical packet signal on the basis of the output signal of the second bias voltage applying unit 117.

As described above, the optical receiver 11 according to the first embodiment includes: the light receiving element 130 that outputs the current signal corresponding to the intensity of the received optical signal; the preamplifier 140 that converts the current signal output by the light receiving element 130 into the voltage signal; the linear amplifier 111 that differentially amplifies the voltage signal output from the preamplifier 140; and the signal detection circuit 110 that detects reception of the optical packet signal being the optical signal on the basis of the output signal from the linear amplifier 111. Moreover, the signal detection circuit 110 includes: the flip-flop circuit 120 that outputs the signal indicating the presence or absence of the optical packet signal on the basis of the output signal from the linear amplifier 111; the limiting amplifier 112 that adjusts the voltage signal differentially amplified by the linear amplifier 111 to the differential signal having a constant amplitude; and the reset signal generator 118 that generates the internal reset signal for resetting the flip-flop circuit 120 using the differential signal for reset based on the output signal from the limiting amplifier 112. Furthermore, the reset signal generator 118 holds the voltage when the differential signal for reset is converted into the single-phase signal, and generates the internal reset signal that is the exclusive OR of the results obtained by comparing the voltage value held with the two predetermined threshold voltages different from each other. As a result, the signal detection circuit 110 can quickly detect signal input at the head of the optical packet signal and can quickly detect signal disconnection at the end of the optical packet signal, thereby being able to improve the performance of detecting the optical packet signal.

Moreover, in the signal detection circuit 110 according to the first embodiment, the reset signal generator 118 generates the internal reset signal on the basis of the differential signal whose amplitude has been adjusted by the limiting amplifier 112, and can thus reduce the influence of noise in the main amplifier circuit 150 of the optical receiver 11 at the time of generating the internal reset signal and prevent or reduce a malfunction. Also, the influence of noise can be reduced so that the high-speed response characteristics can be improved as compared to the configuration disclosed in Japanese Patent Application Laid-open No. 2015-88850, that is, the case of applying the configuration in which the same signal is used to generate the differential signal for detection and the differential signal for reset.

Second Embodiment

Next, a second embodiment will be described. Note that the configuration and operation common to those of the first embodiment will not be described in the second embodiment.

The configurations of the optical communication system 1 and the optical receiver 11 according to the second embodiment are similar to those of the first embodiment (see FIGS. 1 and 2). However, the configuration of the reset signal generator included in the main amplifier circuit 150 of the optical receiver 11 is different from that of the first embodiment. Hereinafter, the reset signal generator according to the second embodiment will be referred to as a reset signal generator 128. As with the reset signal generator 118 described in the first embodiment, the reset signal generator 128 generates an internal reset signal on the basis of a differential signal for reset that is obtained by removing a DC voltage from a differential signal output from the limiting amplifier 112 and applying a bias voltage thereto.

Figure 6:
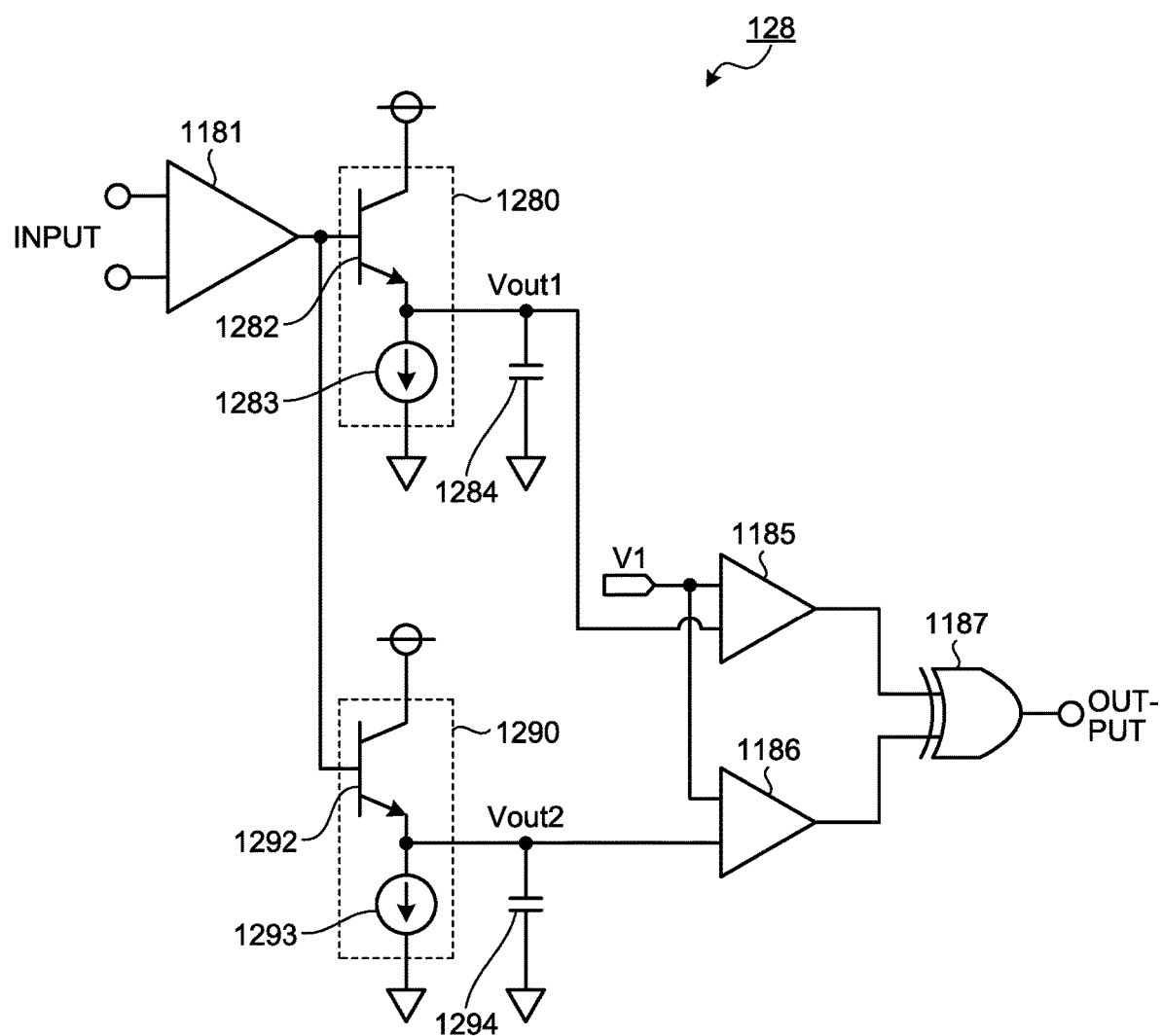
FIG. 6 is a diagram illustrating an example of the configuration of a reset signal generator included in the signal detection circuit according to a second embodiment.

FIG. 6 is a diagram illustrating an example of the configuration of the reset signal generator 128 included in the signal detection circuit according to the second embodiment. Note that components identical to those of the reset signal generator 118 according to the first embodiment are denoted by the same reference numerals as those used in the first embodiment. The components common to those of the reset signal generator 118 according to the first embodiment will not be described.

The reset signal generator 128 is obtained by replacing the emitter follower circuit 1180 of the reset signal generator 118 with a first emitter follower circuit 1280 and a second emitter follower circuit 1290. As illustrated in FIG. 6, the reset signal generator 128 includes: the differential single-phase conversion buffer 1181; a transistor 1282 and a current source 1283 for the first emitter follower circuit 1280 that receive one of signals obtained by splitting the output of the differential single-phase conversion buffer 1181 into two; a capacitor 1284 that holds an output voltage of the first emitter follower circuit 1280; a transistor 1292 and a current source 1293 for the second emitter follower circuit 1290 that receive another one of the split signals; a capacitor 1294 that holds an output voltage for the second emitter follower circuit 1290; the comparator 1185 that compares the threshold voltage V1 with the output voltage of the first emitter follower circuit 1280; the comparator 1186 that compares the threshold voltage V1 identical to that for the comparator 1185 with the output voltage of the second emitter follower circuit 1290; and the exclusive OR circuit 1187 that performs an exclusive OR operation on the outputs of the comparators 1185 and 1186. Here, the current values of the current sources 1283 and 1293 in the two emitter follower circuits (the first emitter follower circuit 1280 and the second emitter follower circuit 1290) are different from each other, or the capacitance values of the capacitors 1284 and 1294 are different from each other. Both the current values of the current sources and the capacitance values of the capacitors may be different from each other.

An operation related to signal detection of the optical receiver 11 according to the second embodiment configured as described above will be described with reference to timing charts of FIGS. 7A to 7G. FIGS. 7A to 7G are diagrams illustrating the timing chart of a signal detection operation by the optical receiver according to the second embodiment. FIGS. 7A to 7G illustrate a response of each signal when an optical signal including an optical packet signal in burst mode as illustrated in FIG. 7A is input to the light receiving element 130. FIG. 7A illustrates the optical packet signal of alternating "1"s and "0"s.

As illustrated in FIG. 7B, a signal output from the preamplifier 140 and input to the main amplifier circuit 150 is a signal containing output noise of the preamplifier 140 in a no-signal section before the optical packet signal transmitted from the ONU 20 starts to be input. The output noise of the preamplifier 140 is noise generated inside the preamplifier 140. Moreover, in a signal input section in which the optical packet signal transmitted from the ONU 20 is input, a differential signal including a positive phase input and a negative phase input based on the pattern of the input optical packet signal is input to the main amplifier circuit 150.

In the main amplifier circuit 150, the input differential signal is differentially amplified by the linear amplifier 111. The signal amplified by the linear amplifier 111 is input to the limiting amplifier 112. The signal amplified by the limiting amplifier 112 is input to the output buffer 113 and at the same time split as the differential signal for reset. The capacitor of the second DC voltage remover 116 removes the DC voltage component of the differential signal for reset, and the second bias voltage applying circuitry 117 applies the bias voltage of a predetermined value to the differential signal for reset, so that a signal as illustrated in FIG. 7C is input to the reset signal generator 128.

The differential signal for reset input to the reset signal generator 128 is converted into a single-phase signal by the differential single-phase conversion buffer 1181 provided in the input part. The single-phase signal is split into two, and for one of the signals, the electric charge is accumulated in the capacitor 1284 by the first emitter follower circuit 1280 (the transistor 1282 and the current source 1283) while the signal of "1" is input, and the electric charge accumulated in the capacitor 1284 is discharged by the current source 1283 while the signal of "0" is input. Here, while the signal of "1" is input, the emitter current of the transistor 1282 for the first emitter follower circuit 1280 increases as compared to that while the signal of "0" is input so that, as illustrated in FIG. 7D, an output voltage Vout1 of the first emitter follower circuit 1280 increases rapidly at the time of reception of the packet signal. On the other hand, while the signal of "0" is input, the output voltage Vout1 decreases linearly with time at the rate of I/C based on the current value I of the current source 1283 of the first emitter follower circuit 1280 and the capacitance C of the capacitor 1284.

For another one of the single-phase signals, the electric charge is accumulated in the capacitor 1294 by the second emitter follower circuit 1290 (the transistor 1292 and the current source 1293) while the signal of "1" is input, and the electric charge accumulated in the capacitor 1294 is discharged by the current source 1293 while the signal of "0" is input (FIG. 7E). Here, since the drive current of the current source 1293 of the second emitter follower circuit 1290 or the capacitance value of the capacitor 1294 is different from the drive current of the current source 1283 of the first emitter follower circuit 1280 or the capacitance value of the capacitor 1284, the rate of change of an output voltage Vout2 is different from the rate of change of the output voltage Vout1.

A result of comparison between the output voltage Vout1 of the first emitter follower circuit 1280 and the threshold voltage V1 by the comparator 1185 and a result of comparison between the output voltage Vout2 of the second emitter follower circuit 1290 and the threshold voltage V1 by the comparator 1186 are input to the exclusive OR circuit 1187. The exclusive OR circuit 1187 outputs an exclusive OR of the comparison result of the comparator 1185 and the comparison result of the comparator 1186. The threshold voltage V1 is set to be higher than the noise level of the emitter follower circuits (the first emitter follower circuit 1280 and the second emitter follower circuit 1290) and lower than the lowest value of the output signal of the emitter follower circuits when the packet signal is input. As a result, the reset signal generator 128 outputs the internal reset signal at the head of the packet and at the end of the packet as illustrated in FIG. 7F. That is, the internal reset signal is output when the input of the optical packet signal is started and when the input is completed.

The internal reset signal having an appropriate duration can be generated at the head of the packet and at the end of the packet by allowing the output voltages Vout1 and Vout2 of the emitter follower circuits to change at different rates of change. The appropriate duration is about 5 ns to 30 ns, for example. Also, in order to prevent the reset signal from being output by mistake even when a consecutive identical digit signal such as a CID signal having a length of about 72 bits is input, the drive current values of the current sources of the emitter follower circuits, the capacitances of the capacitors holding the output voltages of the emitter follower circuits, and the threshold voltage V1 are determined such that the signal has the duration longer than or equal to the length of the CID signal.

In the second embodiment, although the second emitter follower circuit 1290 is added by one as compared with the first embodiment to cause an increase in the circuit scale, the drive current of the second emitter follower circuit 1290 and the capacitance of the capacitor are added as parameters for determining the operating speed of the reset signal generator and thus bring an advantage that flexibility in determining the parameters increases.

As described above, according to the second embodiment, the reset signal generator 128: splits the single-phase signal obtained by the conversion from the differential signal for reset into two; holds one of the signals in the capacitor 1284 provided on the output side of the first emitter follower circuit 1280; holds the other signal in the capacitor 1294 provided on the output side of the second emitter follower circuit 1290; and generates the internal reset signal that is the exclusive OR of the results of comparison between the two voltage values held and the predetermined threshold voltage. This can obtain the effect similar to that of the first embodiment and also enables the duration of the internal reset signal generated by the reset signal generator 128 to be set flexibly, whereby the duration of the internal reset signal can be optimized.

Third Embodiment

Next, a third embodiment will be described. Note that the configuration and operation common to those of the first and second embodiments will not be described in the third embodiment.

The configurations of the optical communication system 1 and the optical receiver 11 according to the third embodiment are similar to those of the first and second embodiments (see FIGS. 1 and 2). However, the configuration of the reset signal generator included in the main amplifier circuit 150 of the optical receiver 11 is different from that of the first and second embodiments. Hereinafter, the reset signal generator according to the third embodiment will be referred to as a reset signal generator 138. As with the reset signal generator 118 described in the first embodiment, the reset signal generator 138 generates an internal reset signal on the basis of a differential signal for reset that is obtained by removing a DC voltage from a differential signal output from the limiting amplifier 112 and applying a bias voltage thereto.

Figure 8:
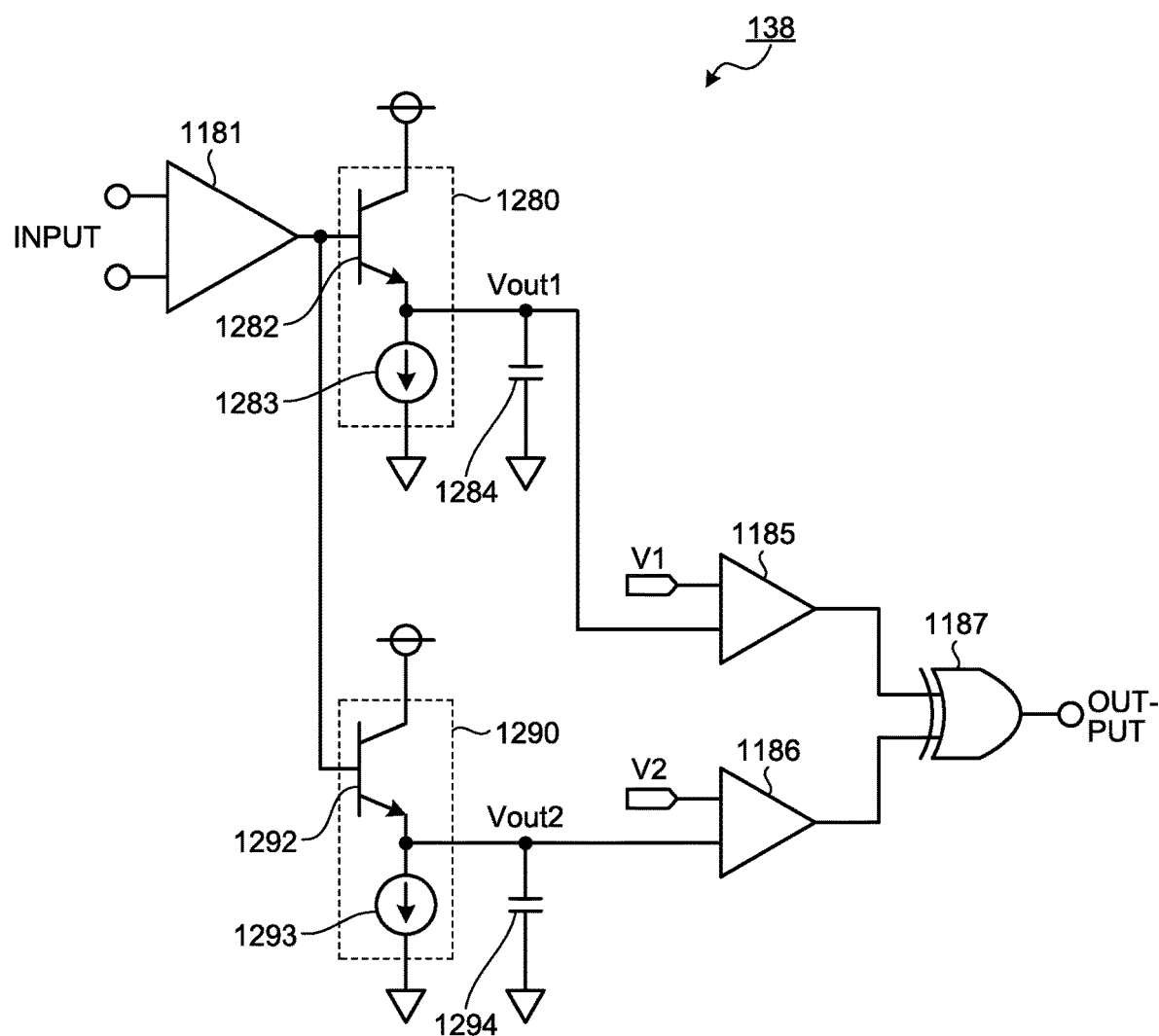
FIG. 8 is a diagram illustrating an example of the configuration of a reset signal generator included in the signal detection circuit according to a third embodiment.

FIG. 8 is a diagram illustrating an example of the configuration of the reset signal generator 138 included in the signal detection circuit according to the third embodiment. Note that components identical to those of the reset signal generator 118 according to the first embodiment or the reset signal generator 128 according to the second embodiment are denoted by the same reference numerals as those used in the first or second embodiment. Components common to those of the reset signal generator 118 according to the first embodiment or the reset signal generator 128 according to the second embodiment will be omitted.

The reset signal generator 138 has the configuration similar to that of the reset signal generator 128 according to the second embodiment. However, different threshold voltages are input to the comparators 1185 and 1186. The threshold voltage V1 is input to the comparator 1185, and the threshold voltage V2 is input to the comparator 1186. Moreover, the current values of the current sources 1283 and 1293 in the two emitter follower circuits (the first emitter follower circuit 1280 and the second emitter follower circuit 1290) are different from each other, and the capacitance values of the capacitors 1284 and 1294 are also different from each other.

The operation related to signal detection of the optical receiver 11 configured as described above is similar to that of the second embodiment. The reset signal generator 138 can more flexibly set the timing for generating the internal reset signal and the duration thereof by: setting the drive currents of the two emitter follower circuits to different values; setting the capacitances of the capacitors 1284 and 1294 to different values; and setting the threshold voltages of the two comparators 1185 and 1186 to different values.

As described above, according to the third embodiment, the reset signal generator 138: splits the single-phase signal obtained by the conversion from the differential signal for reset into two; holds one of the signals in the capacitor 1284 provided on the output side of the first emitter follower circuit 1280; holds the other signal in the capacitor 1294 provided on the output side of the second emitter follower circuit 1290; and generates the internal reset signal that is the exclusive OR of the results of comparison between the two voltage values held and the predetermined threshold voltages. This can obtain the effect similar to that of the first embodiment and also enables the duration of the internal reset signal generated by the reset signal generator 138 to be set flexibly, whereby the duration of the internal reset signal can be optimized.

The signal detection circuit according to the present disclosure has an effect that the high-speed response characteristics can be improved while preventing or reducing an increase in the frequency of occurrence of malfunctions.

The configuration illustrated in the above embodiment merely illustrates an example of the content of the present disclosure, and can thus be combined with another known technique or partially omitted and/or modified without departing from the scope of the present disclosure.

What is claimed is:

1. A signal detection circuit comprising:
a first DC voltage remover to remove a DC voltage from an input differential signal including a packet signal in burst mode;
an amplitude adjuster to adjust an amplitude of the input differential signal;
a reset signal generator to generate an internal reset signal at a head and after an end of the packet signal on the basis of the input differential signal obtained after the amplitude is adjusted by the amplitude adjuster;
a first bias voltage applying circuitry to generate a differential signal for detection by applying a bias voltage of a predetermined value to the signal from which the DC voltage is removed by the first DC voltage remover;
a packet detection signal generator to generate a packet detection signal that indicates signal input and signal disconnection of the packet signal by holding a state indicating input of the packet signal on the basis of the differential signal for detection and releasing the holding on the basis of the internal reset signal;
a second DC voltage remover to remove a DC voltage from the input differential signal obtained after the amplitude is adjusted by the amplitude adjuster; and
a second bias voltage applying circuitry unit to generate a differential signal for reset by applying a bias voltage of a predetermined value to the signal from which the DC voltage is removed by the second DC voltage remover, wherein
the reset signal generator includes:
a differential single-phase conversion circuit to convert the differential signal for reset into a single-phase signal, the differential signal;
a voltage holding circuit to hold a voltage of the single-phase signal; and
a voltage comparison circuit to generate the internal reset signal on the basis of a result of comparison between the voltage held by the voltage holding circuit and a predetermined threshold voltage.

2. The signal detection circuit according to claim 1, wherein
the packet detection signal generator releases the holding on the basis of a logical OR of an external reset signal that is input from outside and the internal reset signal.

3. The signal detection circuit according to claim 2, wherein
the packet detection signal generator is a D flip-flop circuit of a reset input type that inputs the differential signal for detection to a differential clock terminal and inputs the logical OR of the internal reset signal and the external reset signal to a reset terminal.

4. The signal detection circuit according to claim 2, wherein
the packet detection signal generator is an SR flip-flop circuit that inputs the differential signal for detection to a differential clock terminal and inputs the logical OR of the internal reset signal and the external reset signal to a reset terminal.

5. The signal detection circuit according to claim 1, wherein
the voltage holding circuit includes an emitter follower circuit and a capacitor connected in parallel with a current source of the emitter follower circuit to hold a voltage.

6. The signal detection circuit according to claim 1, wherein
the voltage comparison circuit includes two comparators with threshold voltages different from each other, and the internal reset signal is an exclusive OR of outputs of the two comparators when the voltage held by the voltage holding circuit is input to the two comparators.

7. The signal detection circuit according to claim 1, wherein
the voltage holding circuit includes two emitter follower circuits, and two capacitors connected in parallel with current sources of corresponding ones of the emitter follower circuits to each hold a voltage,
drive currents of the current sources of the two emitter follower circuits or capacitance values of the capacitors are different from each other, and
the voltage comparison circuit includes two comparators with a predetermined threshold voltage, and the internal reset signal is an exclusive OR of outputs of the two comparators when the voltages held by the two capacitors are input to the two comparators.

8. The signal detection circuit according to claim 1, wherein
the amplitude adjuster performs limiting processing when the amplitude of the input differential signal is larger than a predetermined amplitude, and performs amplification processing when the amplitude of the input differential signal is smaller than a predetermined amplitude.

9. An optical receiver comprising:
a light receiving element to convert an optical packet signal in burst mode into a current signal;

a preamplifier circuit to convert the current signal output from the light receiving element into a voltage signal; and a main amplifier circuit to amplify the voltage signal output from the preamplifier circuit, wherein the main amplifier circuit includes the signal detection circuit according to claim 1.

10. A master station device comprising the optical receiver according to claim 9.

11. A signal detection method in an optical receiver that detects signal input and signal disconnection of a packet signal in burst mode, the method comprising:

a first DC voltage removing step of removing a DC voltage from an input differential signal including the packet signal;

an amplitude adjustment step of adjusting an amplitude of the input differential signal;

a reset signal generation step of generating an internal reset signal at a start and after an end of the packet signal on the basis of the signal obtained after the amplitude is adjusted in the amplitude adjustment step;

a first bias application step of generating a differential signal for detection by applying a bias voltage of a predetermined value to the signal from which the DC voltage is removed in the first DC voltage removing step;

a packet detection signal generating step of generating a packet detection signal that indicates the signal input and the signal disconnection of the packet signal by holding a state indicating input of the packet signal on the basis of the differential signal for detection and releasing the holding on the basis of the internal reset signal a second DC voltage removing step of removing a DC voltage from the input differential signal of which amplitude is adjusted by the amplitude adjustment step;

a second bias application step of generating a differential signal for reset by applying a bias voltage of a predetermined value to the signal from which the DC voltage is removed in the second DC voltage removing step; wherein the reset signal generation step includes:

a differential single-phase conversion step of converting a differential signal for reset into a single-phase signal;

a voltage holding step of holding a voltage of the single-phase signal; and a voltage comparison step of generating the internal reset signal on the basis of a result of comparison between the voltage held in the voltage holding step and a predetermined threshold voltage.

* * * * *